…

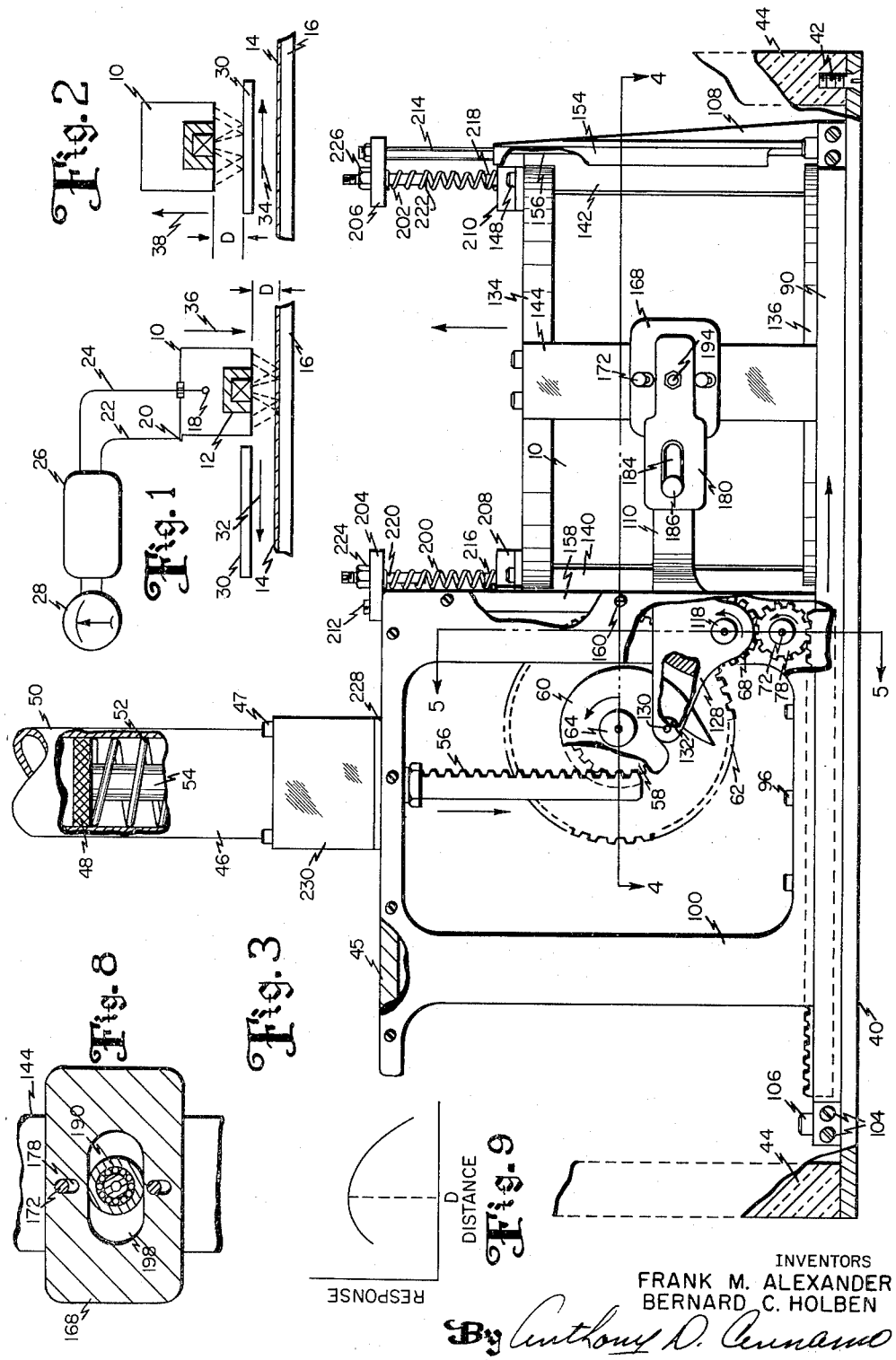

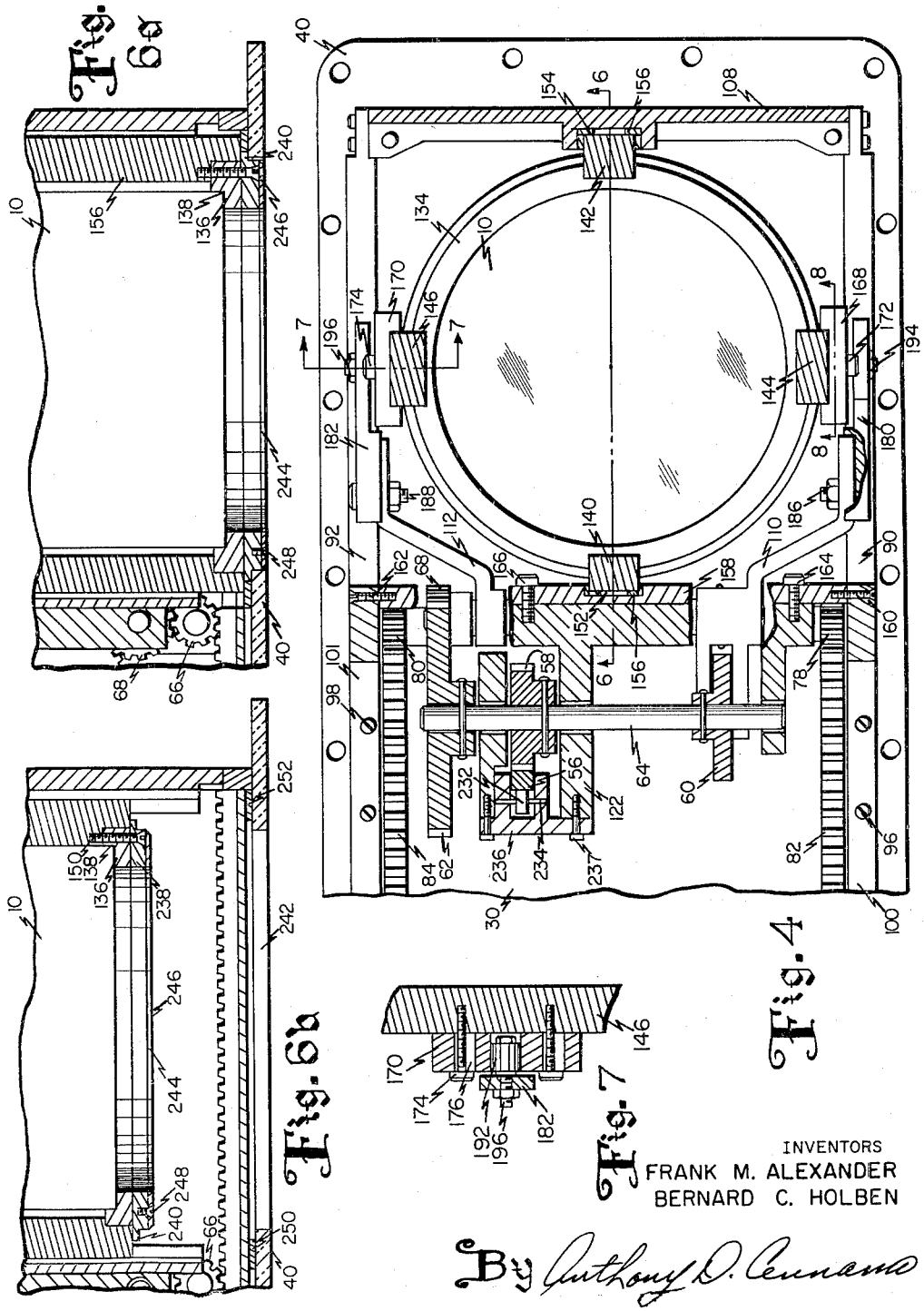

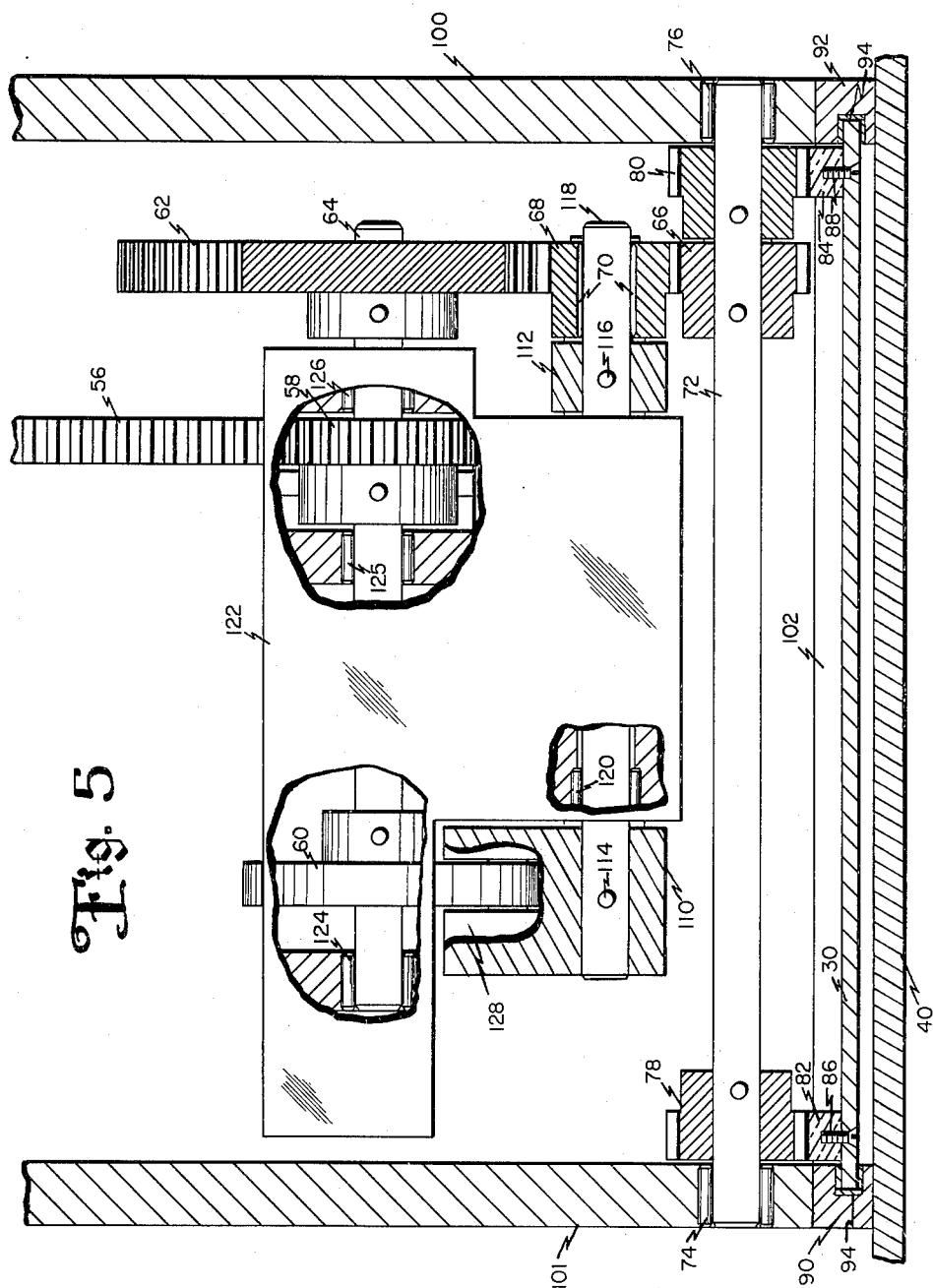

3,001,073
REFLECTIVITY COMPARISON SYSTEM
Frank M. Alexander, Columbus, and Bernard C. Holben, Dublin, Ohio, assignors to Industrial Nucleonics Corporation
Filed May 23, 1957, Ser. No. 661,139
8 Claims. (Cl. 250—83.3)

This invention relates to an industrial instrument for gauging material properties by nuclear radiation reflection measurement techniques, and more specifically it relates to a novel standardization method and a unitary mechanism which performs the dual function of a protective shutter apparatus and a reflectivity comparison standard whereby the accuracy of the instrument can be maintained by a more rapid and efficient automatic standardizing procedure than has heretofore been possible.

Reference is therein made to a co-pending application, Serial No. 629,690, filed December 20, 1956, by Bernard C. Holben for a Shutter System, now U.S. Patent No. 2,858,450, and to another co-pending application Serial No. 662,672, filed May 31, 1957, now U.S. Patent No. 2,951,161, by George B. Foster et al., for Cascade Standardization, which applications set forth background information contributing to a better understanding and appreciation of the present invention, which details accordingly need not be repeated at length in this specification.

In the application of Holben, Serial No. 629,690, there is described a reflection type nuclear radiation gauge utilized for measurement of a property such as weight per unit area or thickness of a traveling sheet of material issuing from a continuous process machine such as a paper machine, plastics calender or electroplating apparatus. The instrument disclosed therein includes an inspection head comprising a nuclear source of penetrative radiation and a radiation detector both mounted on the same side of the path of the measured material to measure a property thereof by quantitatively determining the radiation from the source which is reflected from the measured sheet. In order to protect the source and detector and to minimize any possible health hazard to personnel in the vicinity of the instrument, the source and detector are located inside a shielding housing provided with a shuttered aperture through which emanative radiation may issue and radiation reflected from the measured material may return. The preferred type of shutter comprises an essentially rectangular plate substantially opaque to the radiation beam and slideably mounted for rectilinear movement into and out of the path of the beam emerging through the aperture, thereby to permit free passage of the beam when the shutter is open but blocking the same when the shutter is closed.

In the application of Foster et al., Serial No. 662,672, there is disclosed a method and means for automatically standardizing a radiation reflection gauging instrument of the same general type, which may be used, for example, to measure a property such as thickness of a thin sheet passing over a base reflector of substantially different chemical composition from that of the sheet. Fundamentally the gauge is standardized by removing the measured sheet from between the source and detector assembly and the base reflector and resetting the weight indication to zero for that value of detector response which obtains when the detector observes radiation returned from the base reflector unmodified by the presence of any measured material. However, when the gauge is used in connection with an industrial process wherein the material flows for long periods of time through the machine in an uninterrupted web, the base reflector is continuously covered by the measured sheet so that the fundamental standardization procedure is not possible with the frequency necessary to maintain the fullest accuracy of the instrument. Accordingly there is provided a power driven traversing mount whereon the source and detector assembly may be borne laterally to an off sheet position at one side of the traveling material web and positioned over a standardizing plate having a reflecting surface of substantially constant characteristics. The measuring circuits of the instrument are able to retain a memory of the relationship between the detector response from the standardizing plate, the response from the base reflector, and the response from the measured material. Hence the instrument may be standardized automatically and as frequently as necessary by reference to the standardizing plate.

While the method and apparatus of Foster et al. is highly effective and reliable as a means of maintaining the accuracy of the instrument, the preferred embodiment disclosed in their above referenced co-pending application has certain disadvantages. Firstly, it requires that a traversing mechanism be provided with each instrument to allow the inspection head to be moved off sheet for standardization. While a traversing gauge is almost always desirable for the measurement of wide sheets and the like so as to allow readings to be taken across the profile of the sheet, there are many instances where a single fixed measuring position of the head is entirely adequate, in which case the expense of providing the motorized traversing mount and auotmatic positioning apparatus merely to facilitate standardizaion is not always justified. Secondly, the time allowed to move the gauging head off sheet and return it to measuring position represents lost measuring time, which is highly undesirable in modern quality-controlled manufacturing processes. This is easily understood when it is realized that for each minute that measurement is suspended, several hundreds or thousands of feet of material may run through a fast process machine, unmeasured and uncontrolled. A further difficulty arises due to the fact that ambient conditions of temperature, atmosphere, etc., are different in the off sheet position as opposed to the regular measuring position of the inspection head, contributing to the possibility of standardization error. Still another difficulty arises as a result of the fact that the standardizing plate must be kept extremely clean for accurate standardization, which has often required the use of an automatic cleaning device or automatically operated protective covers and the like to maintain the immaculate condition thereof. These disadvantages and difficulties are minimized or eliminated in the present invention.

In accordance with this invention, there is provided a new and improved type of nuclear radiation reflection gauging head, wherein the radiation shutter performs the function of the standardizing plate of the Foster et al. disclosure as well as its usual function of a protective apparatus. Thus the step of moving the source and detector assembly off sheet is eliminated in the standardization procedure, a very appreciable amount of lost measuring time is recovered, in many instances standardization is more accurate, and in many cases the construction of the instrument can be much simplified and more economical.

It is an object of this invention to provide a new and improved method for standardizing a nuclear radiation gauge of the reflection type.

It is also an object to provide a method and means for standardizing a reflection type nuclear radiation gauge without the necessity of displacing the detector head from its measuring relation to the measured material, or of removing or displacing the measured material from its measuring relation to the detector head.

It is a further object to provide a method and means for more rapidly and efficiently standardizing a nuclear radiation reflection gauge through the use of automatic apparatus.

It is a still further object to provide a unitary mechanism wherein a protective shutter apparatus may also function as a reflectivity comparison standard for maintaining the accuracy of a reflection type nuclear radiation gauge.

It is another object to provide a reflection type nuclear radiation gauge which is more economical to build, install, and maintain.

It is still another object to provide a method and means whereby automatic standardization of a reflection type nuclear radiation gauge may be accomplished more accurately.

The above objects will be clarified, and further objects and advantages of the present invention will become apparent in view of the following detailed description and appended drawings, in which:

FIGURE 1 is a simplified schematic representation of a reflection gauging apparatus in accordance with this invention, wherein the apparatus is shown in measuring position.

FIGURE 2 shows a portion of the apparatus of FIGURE 1 in standardizing position, and when taken in conjunction with FIGURE 1 illustrates the basic principle of the present invention.

FIGURE 3 is an elevation showing an illustrative mechanism for a combination shutter and reflectivity comparison device in accordance with this invention.

FIGURE 4 is a section on the line 4—4 of FIGURE 3.

FIGURE 5 is a section on the line 5—5 of FIGURE 3.

FIGURE 6a is a section on the line 6—6 of FIGURE 4, showing a portion of the apparatus in measuring condition.

FIGURE 6b is also a section on the line 6—6 of FIGURE 4, showing the same portion of the apparatus in standardizing condition.

FIGURE 7 is a partial section on the line 7—7 of FIGURE 4, showing details of the lift mechanism.

FIGURE 8 is a partial section on the line 8—8 of FIGURE 4, showing further details of the lift mechanism.

FIGURE 9 is a plot of detector response versus distance of the source and detector assembly from a reflecting surface, illustrating the desirability of equalizing the distance D in FIGURE 2 with the distance D in FIGURE 1 in accordance with the preferred embodiment of this invention.

Referring to FIGURE 1, the numeral 10 indicates a radiation detector having a radioactive source holder 12 rigidly and permanently mounted therein in accordance with a description given in the above referenced application Serial No. 629,690 of Holben, whereby a characteristic property of a material 14 passing over a base reflector 16 is measured by reflected radiation. The detector 10 has its cathode 18 and its anode 20 connected through leads 22 and 24 to suitable measuring and standardizing circuitry 26 which may be similar to that described in the above referenced application Serial No. 662,672 of Foster et al., and having an indicating, recording, and/or controlling instrument 28 associated therewith.

The shutter 30 is slidably mounted on bearing means of support to maintain the shutter in a plane parallel to that of the base reflector 16 while permitting rectilinear sliding movement of the shutter between an open position and a closed position. This opposed, bi-directional movement is indicated by the arrow 32 in FIGURE 1 and by the oppositely disposed arrow 34 in FIGURE 2. The source and detector assembly including 10 and 12 is also slidably mounted for bi-directional movement synchronous with the movement of the shutter 30, in opposed directions perpendicular thereto as indicated by the arrows 36 and 38 in FIGURE 1 and FIGURE 2 respectively.

FIGURE 1 shows the assembly in open-shuttered measuring position. The detector 10 containing the radioactive source in its holder 12 is positioned a distance D above the top surface of the base reflector 16, and the shutter 30 is withdrawn to an open position clear of the useful radiation beam which impinges upon the measured material 14 and is reflected in modified form into the detector 10. FIGURE 2 shows the assembly in shutter-closed, standardizing position wherein the detector 10 is withdrawn vertically and the shutter 30 is positioned beneath the same so that the detector 10 is at approximately the same distance D from the top surface of the shutter 30 as it was from the top surface of the base reflector 16 for normal measurement. Thus shutter 30 blocks issuance of the radiation beam into the external environment, and at the same time presents a reflectivity standard surface to the source and detector assembly whereby the instrument may be standardized to compensate for error producing variables in the circuitry thereof as well as changes in the detector response which may arise due to such factors as decay of the radioactive source.

Although it is theoretically possible to achieve this standardization in a modified form of the instrument disclosed in the above referenced Holben application without resorting to the expedient of providing a source and detector assmbly which is movable relative to the plane of the shutter, as will be rather obvious in view of the discussion and the circuitry provided in the referenced Foster et al. application, this feature in the preferred embodiment of this invention has an important advantage which becomes apparent in view of FIGURE 9. This figure is a plot of the detector response as a function of the distance of the source and detector assembly from a reflecting surface. It is seen that the distance D is an optimum distance which not only provides maximum response but also gives a point of zero slope on the response curve so that slight errors or changes in the position of the reflector (material or shutter) do not result in significant errors in measurement or standardization.

Referring to FIGURES 3–5 the complete mechanism is supported on a base plate 40 suspended from the rim of a hollow housing member in the general shape of an inverted bathtub which encloses the entire assembly and to which the base plate 40 is secured by bolts as at 42 which pass through holes in the base plate 40 and are threaded into the machined rim 44 of the housing partially indicated in FIGURE 3 which is of the type fully described in the referenced co-pending application of Holben.

The mechanism is actuated by a fluid operated piston and cylinder driving device 46 secured to the frame top plate 45 by cap screws as at 47, having a piston 48 sealingly fitted for sliding movement inside a cylinder 50 and adapted to be forced downward against the compression of a return spring 52 by fluid pressure admitted to the upper end of the cylinder 50. The piston rod 54 driven by the piston 48 has a rack gear 56 as an extension thereof through which the linear motion of the piston is converted to a rotary motion of the pinion 58, cam 60, and gear 62, which rotating parts may be pinned to the shaft 64 as indicated.

Gear 62 drives a pinion 66 through an idler gear 68 which is journaled on needle bearings 70 around the shaft 118. Pinion 66 is secured to the shaft 72 whose ends are supported in bearings 74 and 76 and which also has secured thereto as indicated a pair of additional pinions 78 and 80. Pinions 78 and 80 drive the shutter through rack gears 82 and 84 which are secured to the shutter by means of screws as at 86 and 88. The shutter 30 is supported for sliding movement in longitudinal grooves milled in the guide bars 90 and 92, wherein said grooves have been lined with cemented strips 94 of a suitable material such as is marketed under the well-known trademark Teflon to provide self-lubricating bearing surfaces. A plurality of cap screws as at 96 and 98 pass through mutually aligned holes in the guide bars and the frame side members 100 and 101, and are threaded into the base plate 40 in order to secure these members in place astraddle of the base plate with the frame side members 100 and 101 atop the guide bars 90 and 92. One end of each guide bar is further secured to a cross bar 102 by cap screws as at 104, while the cross bar 102 is in turn fastened to the base plate by means of cap screws as at 106. The other end of each guide bar is similarly attached to an end bracket 108 which also functions as a cross bar in the manner of 102.

Motion of the detector 10 is actuated by the cam 60 through a pair of crank levers 110 and 112 which may be pinned at 114 and 116 to the shaft 118 for oscillating motion therewith. The shaft 118 is journaled in needle bearings as at 120 carried in the bearing block 122 which also carries the shaft 64 in bearings 124, 125 and 126. The end of the crank lever 110 terminates in an integral rocker arm 128 of forked construction which straddles the cam 60. The fork is drilled for a press-fitted pin 130 which carries thereon a ball bearing 132 whose outer race rides on the periphery of the cam 60.

The detector 10 has its upper and lower ends inserted into a pair of phenolic plastic electrically insulating support rings 134 and 136 having annularly milled stepped portions as at 138 cut therein to accommodate the detector as is best shown in FIGURE 6b. The support rings 134 and 136 are in turn mounted on the step-cut ends of four vertically extended blocks 140–146 to which the rings 134 and 136 are secured by screws as at 148 and 150.

Blocks 140 and 142 are guide blocks surfaced for vertical sliding movement in the channels 152 and 154, which may be lined with cemented strips 156 of a suitable material such as Teflon resin compound to provide a self-lubricating bearing surface. The channel 152 is milled into the frame end member 158 which is in turn secured between the frame side members 100 and 101 by means of cap screws as at 160 and 162. The end member 158 also carries the bearing block 122 which supports the shafts 64 and 118; the bearing block 122 being secured to the end member 158 by means of bolts as at 164 and 166. The end bracket 154 is fabricated with the other channel 154 as an integral part thereof.

The blocks 144 and 146 are lifting blocks, each having a shuttle plate 168 and 170 respectively secured thereto by means of cap screws as at 172 and 174 passing through slotted openings as at 176 and 178 in the shuttle plate so as to permit vertical adjustment of the same as is best shown in FIGURE 7 and FIGURE 8. Each of the crank arms 110 and 112 carries an extension plate 180 and 182 which is constructed with a milled channel therein as is best shown in FIGURE 4, which encloses three sides of the crank arm. The extension plates are slotted as at 184 to accommodate bolts 186 and 188 which adjustably secure the extension plates to the crank arms. The channel and slot construction permits adjustment of the length of the crank arms and obtains the necessary rigidity of the arms when the bolts 186 and 188 are tightened. The extension plates 180 and 182 each carry a ball bearing 190 and 192 which is mounted on a shoulder bolt 194 and 196; the shoulder bolt being secured to the extension plate as is best shown in FIGURE 7. The ball bearings ride in the elongated central openings as at 198 in the shuttle plates 168 and 170.

The detector 10 is urged downward by a pair of coil springs 200 and 202 mounted between upper and lower retaining lugs 204 and 206, and 208 and 210. The lug 204 is secured by cap screws as at 212 to the frame top plate 45, whereas the lug 206 is mounted on a pair of upstanding shoulder studs as at 214 threaded into the bracket 108. The lower retaining lugs 208 and 210 are mounted atop the phenolic ring 134 and secured by the bolts as at 148 which pass through the ring and are threaded into the guide blocks 140 and 142. The lower lugs 208 and 210 carry a pair of integral upstanding pegs 216 and 218 which hold the lower ends of springs 200 and 202 in place. The upper ends of the springs are held in alignment by a pair of depending studs 220 and 222 which are threaded into the overhanging lugs 204 and 206 to permit vertical adjustment of the studs. The studs 220 and 222 are of elongated design so as to abut the pegs 216 and 218 when the detector 10 is lifted an optimum distance, thus providing a mechanical stop to prevent further vertical movement of the detector. Referring also to FIGURE 2, it is seen that the vertical adjustment of studs 220 and 222 allows the proper distance D to be equalized with the distance D in FIGURE 1 which is determined in the calibration of the gauge so as to secure the optimum detector response. Once proper adjustment of the studs is obtained, they are secured in position by means of the lock nuts 224 and 226. In setting up the mechanism, the stops 220 and 222 are located in position prior to the adjustment of the length of the crank arms to obtain the proper degree of leverage thereon. The stop motion for the shutter in closed position is provided by the limit of travel of the piston 48 in the cylinder 50. The position of this limit may be adjusted by placing one or more shims 228 of suitable thickness between the frame top plate 45 and the cylinder base 230.

Referring to FIGURE 4, it is seen that the radial thrust tending to separate the rack gear 56 attached to the piston rod from the pinion 58 is taken by a ball bearing 232 supported on a pin 234, which is press fitted into the yoke member 236 which is in turn secured to the bearing block 122 by means of cap screws as at 237.

It will be noted in FIGURE 3 that the contour of the cam provides for an initially very rapid upward movement of the detector so that the shutter 30 may be inserted thereunder shortly after the outset of its travel toward the closed position.

In many gauging applications, a radiation of low penetrating power, e.g., low energy beta rays, is required for satisfactory measurement, so that it is not permissible to place an external cover of "window" over the bottom of the aperture 242. Referring to FIGURES 6a and 6b which respectively show the shutter in open and closed positions, it is seen that the cap screws as at 150, which secure the phenolic detector support ring 136, also retain a metal ring 238 having a flange 240 thereon which is adapted to be seated in the radiation aperture 242 in the base plate 40 when the detector 10 is lowered into measuring position, thereby closing the opening to guard against the entry of excessive dirt, moisture or other foreign material into the mechanism. The source and detector assembly per se may be protected by a thin window 244 constructed of a suitable organic sheet material such as is manufactured and marketed under the well-known trade name of "Mylar," which is cemented to a flat aluminum ring 246 secured to the aperture closing ring 238 by screws as at 248. A pair of felt strips 250 and 252 are cemented to the base plate 40 transversely of the same, having a thickness equivalent to the clearance between the base plate and the shutter 30, which rides over the strips 250 and 252 in closed position, guarding against entry of dirt into the housing when the shutter is closed.

A preferred embodiment of the basic electrical circuitry required to effect proper standardization of the measuring instrument in accordance with the method herein disclosed is illustrated and fully described in connection with FIGURE 2 of the Foster et al. application referenced hereinabove, and accordingly these details need not be repeated in this specification. If desired, the method of this invention may be carried out by fully automatic means, for example, by an obvious modification of the apparatus illustrated in FIGURE 6 of the said Foster et al. application. This modification is in fact no more than a simplification of that apparatus due to the elimination of functions thereof which are rendered unnecessary by the present invention. Accordingly such modification is considered well within the skill of one working in the art.

Obviously a great many modifications can be made in the disclosed apparatus without departing from the spirit and scope of the invention. For example, although the "reference reflector" set forth in the claims is herein illustrated and described as the shutter 30 in view of its dual function, it is not necessarily essential to standardization that the reference reflector should also fulfill the requirements of a shutter. The embodiment disclosed herein was constructed to prove the practicability of the method. It is believed that a considerably more compact inspection head can be designed utilizing a vane type hydraulic actuator such as is manufactured and marketed under the trademark "Hydromotor" by Hydromotor Products Division of Ex-Cell-O Corporation of Canton, Ohio, replacing the linear piston and cylinder type driving device herein illustrated.

What is claimed is:

1. An apparatus for gauging a material by directing a beam of penetrative radiation into a surface of said material from one side of the same and quantitatively detecting radiation reflected from said material and returned backwardly from the same side thereof to provide a quantitative indication of a variable property of said material, comprising a source and detector assembly including a radioactive source for providing said radiation beam, a radiation detector having an output functional of radiation reflected from matter in the path of said beam, and a common supporting structure for said source and said detector; a shutter substantially opaque to said radiation beam; bearing means for supporting said shutter for movement parallel to at least one portion of said material surface, means for supporting said bearing means in fixed spaced relation to said material surface; a mechanical linkage interconnecting said shutter and said source and detector assembly for effecting relative movement therebetween, said linkage including means for moving said shutter between a first position blocking the path of said radiation beam and a second position removed from the path of said radiation beam, and means for moving said source and detector assembly between a first alternate position spaced a predetermined distance from a surface of said shutter when said shutter is in said first position and a second alternate position spaced substantially the same distance from said material surface when said shutter is in said second position; means for actuating said linkage, indicating means responsive to said detector output for providing an indication of the value of said variable property of said material when said shutter is in said second position and for providing a reference indication when said shutter is in said first position, and means for compensating said indicating means for changes in said reference indication to restore the accuracy of said variable property indication.

2. In gauging a material by directing a beam of penetrative radiation from a radioactive source into the material from one side thereof and quantitatively detecting radiation reflected from said material and returned outwardly from the same side thereof to provide a quantitative indication of a variable property of said material, the method of standardizing said indication to compensate for sources of error therein which comprise inserting a radiation reflector into the path of said radiation beam between said material and said source, quantitatively detecting the reflected radiation returned backwardly from said reflector to provide a datum reference value of said indication independent of variations in said variable property of said material, correcting said datum reference value of said indication to restore the accuracy of said variable property indication, removing said reflector from the path of said radiation beam, and resuming said gauging of said material.

3. In gauging a material by directing a beam of penetrative radiation from a radioactive source into said material from one side of the same and quantitatively detecting radiation reflected from said material and returned backwardly from the same side thereof to provide an indication of a variable property of said material, the method of effecting a substantial reduction in the intensity of said radiation beam and concurrently compensating said indication for sources of error therein which comprises inserting a shielding mass into the path of said beam between said source and said material to attenuate said beam, quantitatively detecting reflected radiation returned backwardly from said shielding mass to provide a datum reference value of said indication, correcting said datum reference value to restore the accuracy of said variable property indication, removing said shielding mass from the path of said radiation beam, and resuming said gauging of said material.

4. The method of gauging a material to obtain error-compensated measurements of a variable property thereof, which comprises directing a beam of penetrative radiation from a radio-active source into said material from one side of the same, quantitatively detecting reflected radiation returned backwardly from the same side of said material to provide an indication of said variable property; periodically inserting a shielding mass into said radiation beam between said material and said source to attenuate said beam, quantitatively detecting reflected radiation returned backwardly from said shielding mass to provide a datum reference value of said indication, correcting said datum reference value to restore the accuracy of said variable property indication, removing said shielding mass from the path of said radiation beam, and resuming said indication of said variable property.

5. An inspection head for a radiation gauge adapted to provide non-contacting measurement of a material from one side thereof, comprising a source and detector assembly including a radioactive source for emitting a primary beam of penetrative radiation normally incident on a surface of said material, a radiation detector normally receiving reflected radiation returned backwardly from said surface to provide a quantitative indication of a variable property of said material, means for directing said primary radiation beam in the direction of said surface and for shielding said detector from said primary beam, mounting means entirely on one side of said material for rigidly interconnecting said source, said detector and said shielding means in fixed, mutually spaced relationship; reflectivity comparison means for selectively obtaining said quantitative indication and a standardization reference indication from said detector alternatively, said reflectivity comparison means comprising a reference reflector for said primary radiation beam, means for retracting said source and detector assembly including said source and said detector in a direction to increase the distance thereof from said material surface, means for introducing said reference reflector into the path of said primary beam between said retracted source and said material surface so as to reflect a substantial portion of said primary beam backwardly from said reflector toward said retracted detector to provide said reference indication therefrom, means for withdrawing said reference reflector out of the path of said primary beam, and means for reversing said retracting movement.

6. An inspection head as in claim 5 wherein said retracting, introducing, withdrawing and reversing means comprise a synergetic two-position mechanical linkage interconnecting said source and detector assembly and said reference reflector, one of said positions being a measuring position and the other position being a standardization reference position wherein said measurement is interrupted.

7. An inspection head as in claim 5 wherein said reference reflector comprises a member substantially opaque to said radiation beam, being adapted to shield said material and the environment thereof from said penetrative radiation when introduced into said path.

8. The method of gauging a material to obtain error-compensated measurements of a variable property thereof, which comprises directing a beam of penetrative radiation from a radioactive source into said material from one side of the same, quantitatively detecting reflected radiation returned backwardly from the same side of said material to provide an indication of said variable property; periodically retracting said source to increase the gap separating said source from said material, inserting a reference reflector into said gap so as to return backwardly a reference intensity of reflected radiation, quantitatively detecting said reference intensity to provide a datum reference value of said indication, correcting said reference indication if necessary, removing said reference reflector from said gap, decreasing said gap to the original distance, and resuming said measurement.

References Cited in the file of this patent

UNITED STATES PATENTS

| | | |
|---|---|---|
| 2,629,831 | Atchley | Feb. 24, 1953 |
| 2,714,669 | Wuppermann | Aug. 2, 1955 |
| 2,759,108 | Molins | Aug. 14, 1956 |
| 2,769,097 | Lord | Oct. 30, 1956 |
| 2,858,450 | Holben | Oct. 28, 1958 |

OTHER REFERENCES

Radioisotope in Industry, edited by John Bradford, published by Reinhold Publishing Co., 330 West 42nd Street, New York 36, N.Y., in 1953, pages 80–83.